US010718259B2

(12) United States Patent
Bastanipour et al.

(10) Patent No.: US 10,718,259 B2
(45) Date of Patent: Jul. 21, 2020

(54) METHOD AND SYSTEM FOR CONTROLLING ENGINE TORQUE RESERVE

(71) Applicant: Ford Global Technologies, LLC, Dearborn, MI (US)

(72) Inventors: Michael Bastanipour, Ferndale, MI (US); Nicholas Herhusky, Dearborn, MI (US); Adam Richards, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 16/165,916

(22) Filed: Oct. 19, 2018

(65) Prior Publication Data

US 2020/0123965 A1 Apr. 23, 2020

(51) Int. Cl.
*F02B 37/12* (2006.01)
*F02P 5/04* (2006.01)
*F02D 41/00* (2006.01)
*F02P 5/15* (2006.01)
*F02B 37/10* (2006.01)

(52) U.S. Cl.
CPC ............. *F02B 37/12* (2013.01); *F02B 37/10* (2013.01); *F02D 41/0007* (2013.01); *F02P 5/045* (2013.01); *F02P 5/1502* (2013.01); *F02B 2037/122* (2013.01); *F02D 2200/04* (2013.01); *F02D 2200/1002* (2013.01); *F02D 2200/503* (2013.01); *F02D 2200/606* (2013.01); *F02D 2200/701* (2013.01)

(58) Field of Classification Search
CPC .... F02B 37/12; F02B 37/10; F02B 2037/122; F02D 41/0007; F02D 2200/04; F02P 5/045; F02P 5/1502; F05D 2220/40; Y02T 10/144
See application file for complete search history.

(56) References Cited

U.S. PATENT DOCUMENTS

| 8,225,608 | B2 * | 7/2012 | Wu | B60K 6/48 60/608 |
| 8,490,393 | B2 * | 7/2013 | Lofgren | F02B 37/105 60/608 |
| 8,602,001 | B2 * | 12/2013 | Kaiser | F02D 41/064 123/350 |
| 9,534,531 | B2 * | 1/2017 | Benjey | B60K 6/485 |
| 9,567,922 | B2 * | 2/2017 | Lofgren | B60K 6/24 |
| 9,677,510 | B2 * | 6/2017 | Styles | F02B 37/18 |
| 2010/0107632 | A1 * | 5/2010 | Wu | B60K 6/48 60/608 |

(Continued)

FOREIGN PATENT DOCUMENTS

WO 2011120520 A1 10/2011

*Primary Examiner* — Jesse S Bogue
(74) *Attorney, Agent, or Firm* — Geoffrey Brumbaugh; McCoy Russell LLP

(57) ABSTRACT

Methods and systems are provided for providing torque reserve via an electrically assisted turbocharger. A portion of requested torque reserve is provided by intentionally reducing turbine speed of an electric turbocharger by operating the associated electric motor as a generator. The resulting reduction in air mass allows for the torque reserve to be provided with reduced reliance on spark and throttle based torque reserve.

19 Claims, 4 Drawing Sheets

(56) References Cited

U.S. PATENT DOCUMENTS

2014/0224228 A1\* 8/2014 Benjey ................... B60K 6/485
           123/559.3
2015/0176481 A1\* 6/2015 Jaeger ....................... F01N 5/04
           60/608
2015/0275771 A1 10/2015 Pochner et al.

\* cited by examiner

METHOD AND SYSTEM FOR CONTROLLING ENGINE TORQUE RESERVE

FIELD

The present description relates generally to methods and systems for controlling a vehicle engine to vary the torque reserve contribution from spark, throttle, and electrically assisted turbocharger adjustments.

BACKGROUND/SUMMARY

Internal combustion engines combust an air and fuel mixture within cylinders to generate engine torque. During part-load conditions, a percentage of the engine torque may be held in reserve (known as torque reserve) so as to improve an immediate response of the engine during a transient increase in torque demand. In the absence of torque reserve, engine response time may be slower and drivability may be adversely affected.

Engine control systems may provide a demanded torque reserve by adjusting one or more torque affecting engine parameters such as engine air flow and spark timing. Partially closing an intake air throttle reduces the amount of air available to the engine for combustion, generating an air reserve. Likewise, retarding spark timing results in a later combustion which generates a spark reserve. The air and spark reserves are used for generating the torque reserve. As engine operating conditions change, the torque reserve value may be varied. Other parameters that may be actuated to affect the torque reserve include valve timing and fuel injection timing.

One example approach for adjusting an engine torque output including an amount of torque held back in reserve is shown by Pochner et al. in US 2015/0275771. Therein, each of an intake and exhaust valve phaser, an exhaust waste gate valve coupled to an intake turbocharger, and an intake throttle valve are adjusted based on an expected future increase in torque request. The parameters are adjusted to create a fast torque reserve that is based on the anticipated change in torque.

However, the inventors herein have recognized potential issues with such systems. As one example, in the approach of Pochner, the torque actuator adjustments are based on an anticipated change in torque. A larger torque reserve may be created in anticipation of a larger or faster increase in requested torque. However, if the actual increase in requested torque is smaller or slower, torque is wasted. Specifically, spark reserve may be over scheduled and, since spark reserve is immediate, there may be a loss in efficiency if all the reserve is not used. As another example, use of any torque reserve sacrifices engine efficiency during part load operation for drivability. In particular, the response and "feel" of the engine is improved at the cost of the overall efficiency.

In one example, the issues described above may be addressed by a method for an engine comprising: reducing a speed of a turbocharger via an electric motor while increasing an intake throttle opening and advancing a spark timing, a degree of the increasing the intake throttle opening and advancing the spark timing based on the reduced speed of the turbocharger and a desired torque reserve. In this way, at least a portion of torque reserve can be provided via an intentionally slowed down turbocharger in lieu of air and spark reserve.

As one example, an engine may include an electrically assisted turbocharger having an electric motor coupled to the compressor and/or the turbine of a turbocharger. By operating the electric motor, torque reserve can be additionally provided via adjustments to turbine speed. For example, during part-load boosted engine operation, the turbine speed can be intentionally decreased (below the turbine speed that would naturally occur at the current settings) by operating the motor in a regeneration mode. The reduction in turbine speed reduces the manifold pressure and thereby the air mass ingested into the engine. This allows for the engine to be operated with a smaller air reserve, by holding the throttle more open, and smaller spark reserve, by applying a smaller amount of spark retard. For example, instead of scheduling a 5% air reserve by closing the throttle by an additional amount to provide a corresponding throttle plate delta pressure (TPDP), regeneration through the negative motor torque is used to slow the turbocharger to a speed corresponding to a 5% reduction in air mass. At the same time, the throttle may kept wide open (WOT). As a result, better control of transient manifold filling is provided without the efficiency penalty associated with TPDP because energy can be regenerated in the process.

In this way, adjustments to an electric assisted turbocharger can be coordinated with throttle and spark adjustments to provide a desired torque reserve. By reducing turbine speed at part-load engine operation via an electric motor operating in a regeneration mode, an air mass provided to the engine can be reduced. The improved manifold filling improves part load drivability as the manifold fills faster and torque response is smoother. By providing at least a portion of the torque reserve via the electric turbocharger, the reliance on spark and throttle reserve is reduced. In addition, efficiency losses associated with over scheduling spark reserve are reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
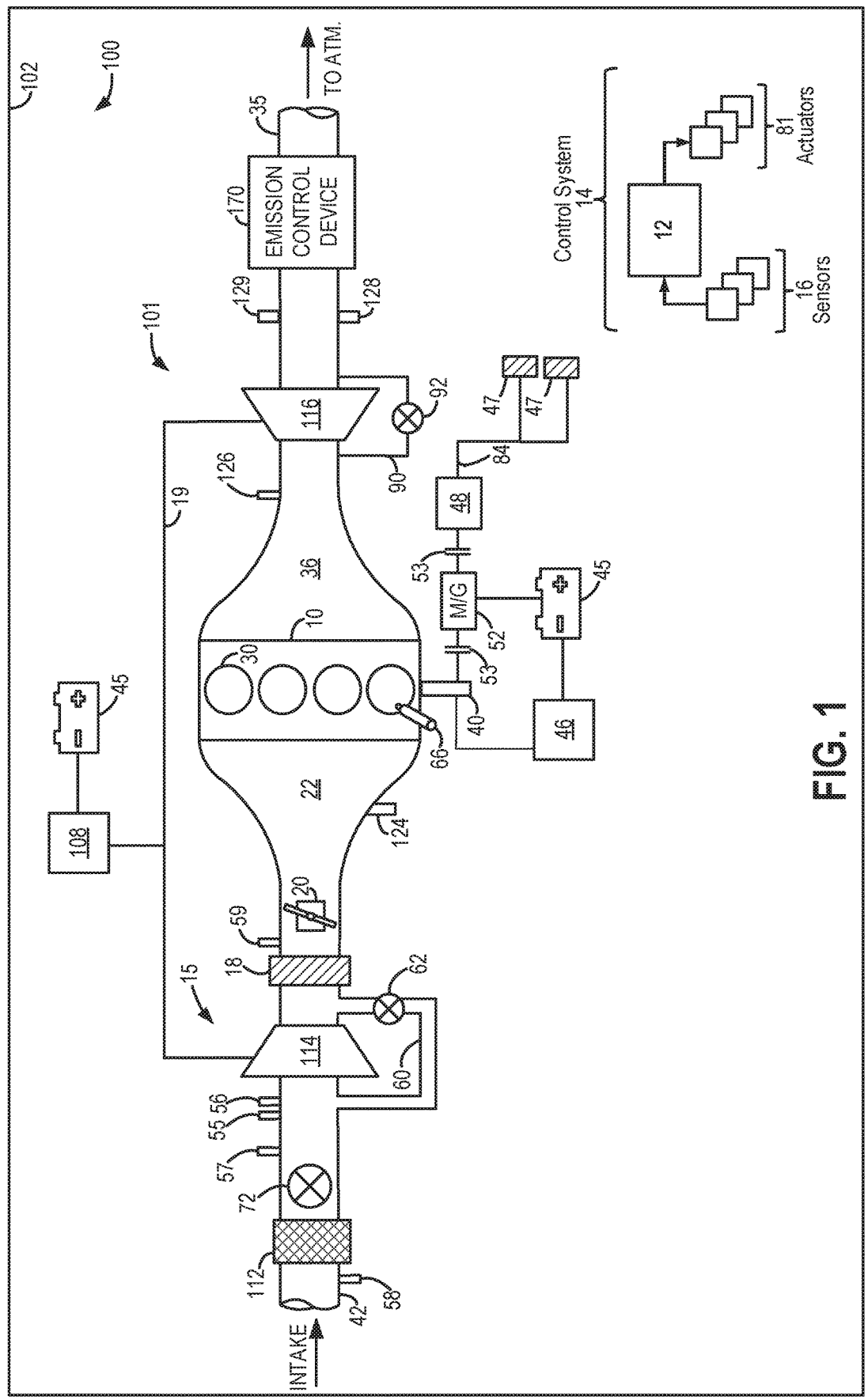
FIG. 1 shows an example embodiment of a boosted engine system configured with an electrically assisted turbocharger.
Figure 3:
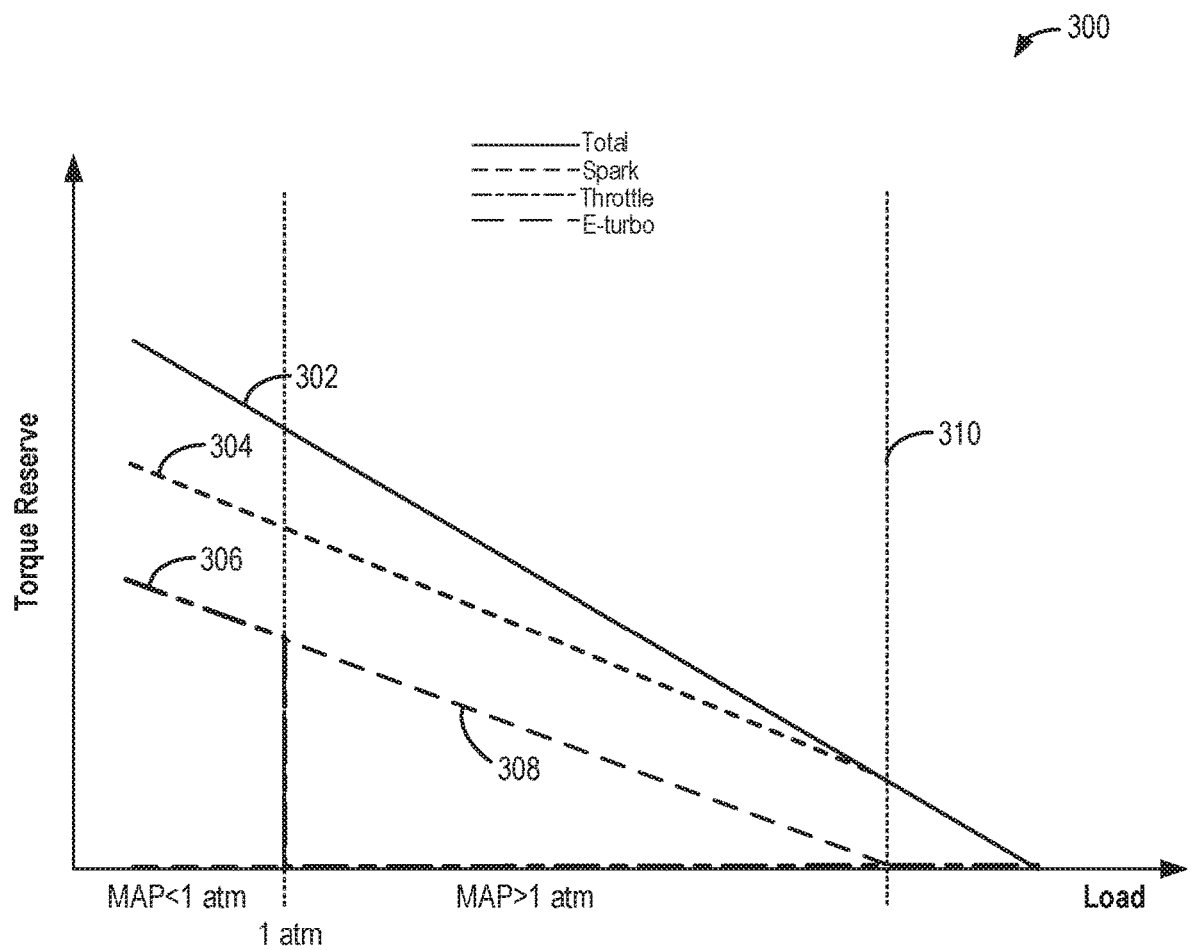
FIG. 3 depicts a map of variation in torque reserve contribution from each of an electrically assisted turbocharger, spark timing, and throttle position, with changing engine load.
Figure 4:
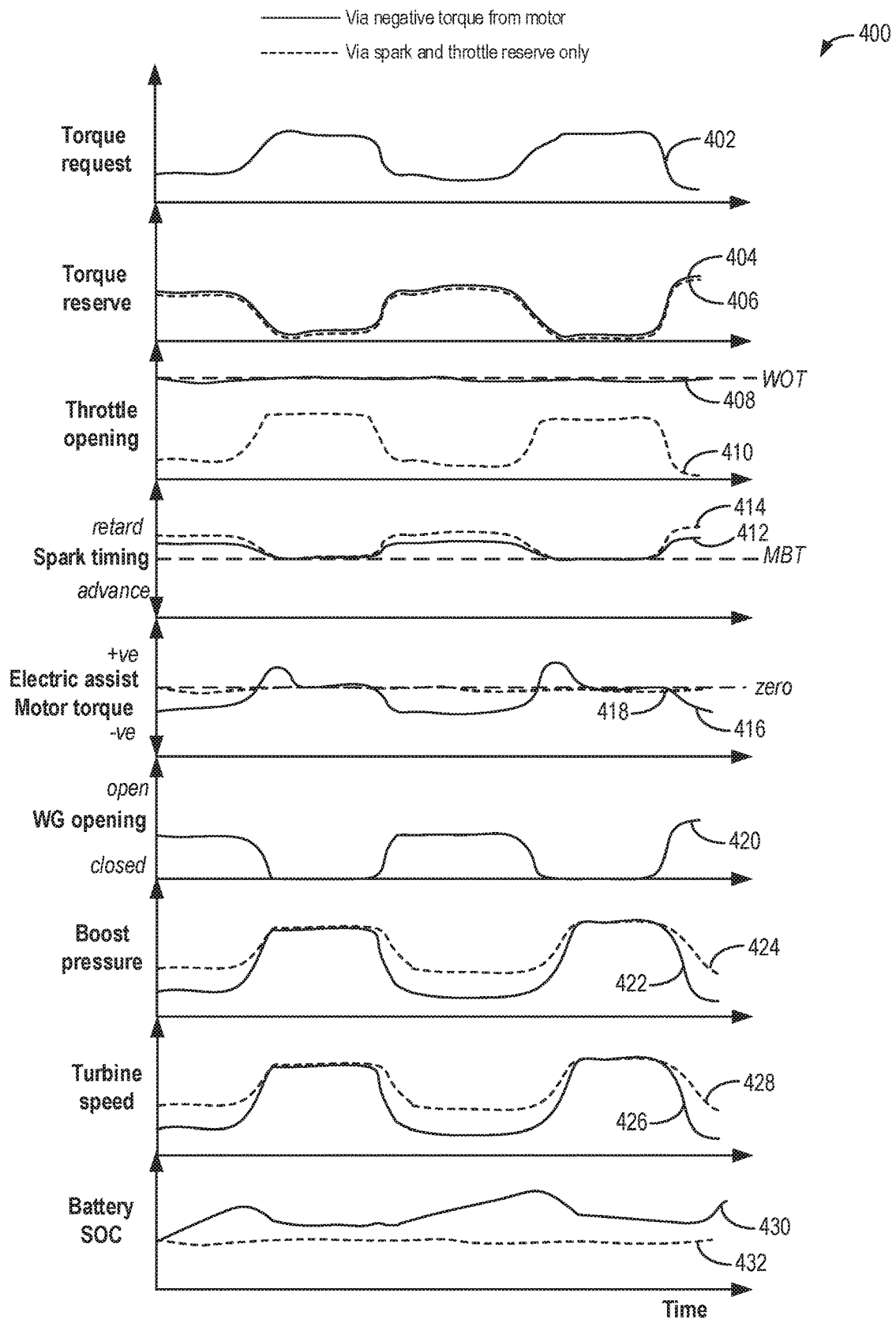
FIG. 4 shows a prophetic example of using an electric assist turbocharger to engine provide torque reserve during changing torque demand.

The following description relates to systems and methods for improving performance in a vehicle system having an engine with a boosting device that is configured with electric assistance from an electric motor. One non-limiting example of such a system is shown in FIG. 1, wherein an electric turbocharger is provided in a hybrid electric vehicle. An engine controller may be configured to perform a control routine, such as the example routine of FIG. 2, to provide a required torque reserve during part-load conditions by coordinating the actuation of an intake throttle and spark timing with turbine speed adjustments enabled by the electric motor. A prophetic example of coordinating electric assist motor operation with throttle and spark reserve is shown in FIG. 4. The adjustments may be based on a mapped torque reserve contribution from various torque actuators, such as the shown in the map of FIG. 3.

FIG. 1 schematically shows aspects of an example vehicle system 100, including an engine system 101 having an engine 10 coupled in a vehicle 102. In the depicted example, vehicle 102 is a hybrid electric vehicle with multiple sources of torque available to one or more vehicle wheels 47. However in alternate examples, vehicle system 100 may include a conventional non-hybrid powertrain. In the example shown, a powertrain of vehicle 102 includes engine 10 and an electric machine 52. Electric machine 52 may be a motor or a motor/generator. Engine 10 and electric machine 52 are connected to vehicle wheels 47 via a transmission 48 when one or more clutches 53 are engaged. In the depicted example, a (first) clutch 53 is provided between engine 10 and electric machine 52, and a (second) clutch 53 is provided between electric machine 52 and transmission 48. A controller 12 may send a signal to an actuator of each clutch 53 to engage or disengage the clutch, thereby connecting or disconnecting engine 10 from electric machine 52 and the components connected thereto and/or connecting or disconnecting electric machine 52 from transmission 48 and the components connected thereto. For example, torque from engine 10 may be transferred to vehicle wheels 47 via a crankshaft 40, transmission 48, and a powertrain shaft 84 when clutches 53 are engaged. Transmission 48 may be a gearbox, a planetary gear system, or another type of transmission. Transmission 48 may be a fixed ratio transmission that includes a plurality of gear ratios to allow engine 10 to rotate at a different speed than wheels 47. By changing a torque transfer capacity of first clutch 53 (e.g., an amount of clutch slippage), an amount of engine torque relayed to the wheels via powertrain shaft 84 may be modulated.

Electric machine 52 may be an HEV motor coupled in the drivetrain between the engine and the transmission. In still other examples, electric machine 52 may be a crankshaft integrated starter/generator (CISG). The CISG may be coupled to an output shaft of the engine so that during a startup of the hybrid vehicle system, the CISG may provide torque to turn the engine to facilitate startup of the engine. Under some conditions, the CISG may supply torque output to supplement or replace engine torque. Further, as elaborated herein, under some conditions, the CISG may supply negative torque output (that is, absorb driveline or engine torque) that may be converted into electric energy, such as for charging a system battery.

The powertrain may be configured in various manners, including as a parallel, a series, or a series-parallel hybrid vehicle. In electric vehicle embodiments, a system electrical energy device, such as system battery 45 may be coupled to the driveline. System battery 45 may be a traction battery, for example a 48V battery that delivers electrical power to electric machine 52 to provide torque to vehicle wheels 47. In some embodiments, electric machine 52 may also be operated as a generator to provide electrical power to charge system battery 45, for example, during a braking operation using regenerative torque. It will be appreciated that in other embodiments, including non-electric vehicle embodiments, system battery 45 may be a typical starting, lighting, ignition (SLI) battery coupled to an alternator 46.

It will be appreciated that while the system electrical energy storage device 45 is depicted herein as a battery, in other examples, the electrical energy storage device 45 may be a capacitor.

In the depicted embodiment, engine 10 is a boosted engine configured with a boosting device, herein shown as turbocharger 15. Turbocharger 15 includes compressor 114 that is mechanically coupled to, and driven by, turbine 116 via a shaft 19, the turbine 116 driven by expanding engine exhaust. In one embodiment, the turbocharger may be a twin scroll device. In another embodiment, the turbocharger may be a variable geometry turbocharger (VGT), wherein turbine geometry is actively varied as a function of engine operating conditions. Turbocharger 15 may be further configured as an electrically assisted turbocharger having an electric motor 108 (herein also referred to as an electric assist motor) configured to provide electric assistance to the compressor, turbine, or turbocharger shaft. In the depicted example the electric motor 108 is coupled to shaft 19 although in other examples, the electric motor may be selectively coupled to the compressor 114 or the turbine 116. Electric motor 108 may be powered by an on-board energy storage device, such as system battery 45 (which may be the same or different from the battery coupled to electric motor 52). Electric motor 108 may be additionally or alternatively powered by alternator 46.

It will be appreciated that while the depicted example shows the turbocharger as the boosting device, the turbocharger configured with electric assistance, this is not meant to be limiting. In still further examples, the engine may be a compound boosted engine system having an electrical supercharger (not shown) coupled upstream or downstream of the turbocharger in the engine intake. Therein, the supercharger may be the boosting device configured to receive electric assistance from electric motor 108 while turbocharger 15 may or may not be configured to receive electric assistance from electric motor 108.

An amount of electrical power delivered to electric motor 108 may be varied in order to adjust a duty cycle of the turbocharger and thereby vary a turbine speed. In one example, the amount of electric power delivered to electric assist motor 108 may be increased to increase the speed of turbine 116 which in turn increases the speed of compressor 114. As a result of the electrical assistance provided by the positive motor torque, compressor 114 of turbocharger 15 may be rapidly spun up, reducing turbo lag. In addition, as elaborated at FIG. 2, positive motor torque from motor electric assist motor 108 may be provided during selected part-load conditions with the throttle more closed to enable boost pressure to be held in reserve, thereby providing a torque reserve.

Electric assist motor 108 may be configured as a motor-generator. Thus, during conditions when electric assistance is required for boost build-up, the electric motor may provide positive torque (herein also referred to as motor torque) to drive either the centrifugal compressor of the supercharger, or the turbocharger shaft, to improve the transient boost pressure delivery or provide torque reserve. However, the electric motor is also capable of energy recuperation by "braking" the motor shaft. Therein, negative torque (herein also referred to as regenerative torque) may be applied to the compressor (or shaft or turbine), reducing the compressor speed and concurrently charging the system battery (such as battery 45) coupled to the electric motor 108. As elaborated at FIG. 2, during other selected part-load conditions, torque reserve can be created through the intentional slowing of the turbocharger. Therein, negative motor torque applied from the electric motor may be used to spin down the turbine. In this way, based on engine conditions, torque reserve may be created via the electric boost assisted turbocharger using either positive motor torque or negative motor torque from the associated electric motor.

Fresh air is introduced along intake passage 42 into engine 10 via air box 112 and flows to compressor 114. Air is then compressed at compressor 114 and introduced into engine 10. Air compressed by turbocharger 15 may also be recirculated from downstream of the compressor 114 and downstream of a charge air cooler 18 to an inlet of compressor 114 through a compressor recirculation passage 60 by adjusting an opening of a continuously variable compressor recirculation valve (CCRV) 62. CCRV 62 may be a continuously variable valve and increasing the opening of the CCRV 62 may include actuating (or energizing) a motor or solenoid to open the valve. In alternate examples, compressor recirculation passage 60 may couple the compressor outlet, upstream of the CAC 18, to the inlet of compressor 114.

CCRV 62 may be a continuously variable valve wherein a position of the valve is continuously variable from a fully closed position to a fully open position. In some embodiments, CCRV 62 may be partially open during boosted engine operation to provide a surge margin. Herein, the partially open position may be a default valve position. Then, in response to an indication of surge, the opening of CCRV 62 may be increased. For example, CCRV 62 may be adjusted from the default, partially open position toward a fully open position, with a degree of opening based on the indication of surge (e.g., the compressor pressure ratio, the compressor flow rate, a pressure differential across the compressor, etc.). In alternate examples, CCRV 62 may be held closed during boosted engine operation (e.g., peak performance conditions) to decrease boost response time and increase peak performance.

Compressor 114 is coupled to a throttle valve 20 through a charge-air cooler (CAC) 18 (also referred to as an intercooler herein). Air flows from compressor 114 through CAC 18 and throttle valve 20 to an intake manifold 22. CAC 18 may be an air-to-air or water-to-air heat exchanger, for example. Intake manifold pressure (e.g., a pressure of the air charge within the intake manifold) may be determined using a manifold absolute pressure (MAP) sensor 124.

Intake manifold 22 is coupled to a series of combustion chambers 30 through a series of intake valves (not shown). The combustion chambers are further coupled to an exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted for the desired combustion and emissions-control performance. For example, the cam timing may be adjusted via a variable cam timing system to move the intake and exhaust cams to a position that provides the optimal volumetric efficiency for the given operating conditions.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the depicted example, fuel is provided to each combustion chamber 30 via direct injection by a fuel injector 66 (while only one fuel injector is shown in FIG. 1, each combustion chamber includes a fuel injector coupled thereto). Fuel may be delivered to fuel injector 66 by a fuel system (not shown) including a fuel tank, a fuel pump, and a fuel rail. In the combustion chambers, combustion may be initiated via spark ignition (in the depicted example) and/or compression ignition (in another example). Spark timing may be adjusted to alter combustion properties. For example, spark timing may be advanced towards MBT (maximum brake torque) settings to improve engine performance. As another example, spark timing may be retarded from MBT settings to hold a portion of the engine torque in reserve.

As shown in FIG. 1, exhaust from exhaust manifold 36 is directed to turbine 116 to drive the turbine. When reduced turbine torque is desired, a portion of exhaust may be directed instead through a waste-gate 90, bypassing the turbine. A waste-gate actuator 92 (e.g., waste-gate valve) may be actuated open to relieve at least some exhaust pressure from upstream of turbine 116 to a location downstream of turbine 116 via waste-gate 90. By reducing exhaust pressure upstream of turbine 116, turbine speed may be reduced.

The combined flow from turbine 116 and waste-gate 90 flows through an emission control device 170. In general, emission control device 170 may include one or more exhaust after-treatment components configured to reduce an amount of one or more substances in the exhaust flow. For example, one exhaust after-treatment component may be configured to trap $NO_x$ from the exhaust flow when the exhaust flow is lean and to reduce the trapped $NO_x$ when the exhaust flow is rich. In other examples, an exhaust after-treatment component may be configured to disproportionate $NO_x$ or to selectively reduce $NO_x$ with the aid of a reducing agent. In still other examples, emission control device 170 includes a three-way catalyst configured to oxidize residual hydrocarbons and carbon monoxide while reducing $NO_x$ in the exhaust flow. Different exhaust after-treatment catalysts having any such functionality may be arranged in wash coats or elsewhere in emission control device 170, either separately or together. In some embodiments, the emission control device 170 may further include a regeneratable soot filter configured to trap and oxidize soot particles in the exhaust flow.

All or part of the treated exhaust from emission control device 170 may be released into the atmosphere via an exhaust conduit 35. Depending on operating conditions, however, some exhaust may be diverted instead to intake passage 42 via an exhaust gas recirculation (EGR) passage (not shown), including an EGR cooler and an EGR valve. EGR may be recirculated to the inlet of compressor 114.

One or more sensors may be coupled to the inlet of compressor 114. For example, a temperature sensor 55 may be coupled to the inlet of compressor 114 for estimating a compressor inlet temperature. As another example, a pressure sensor 56 may be coupled to the inlet of compressor 114 for estimating a pressure of air entering the compressor. Still other sensors may include, for example, air-fuel ratio sensors, humidity sensors, etc. In other examples, one or more of the compressor inlet conditions (such as humidity, temperature, pressure, etc.) may be inferred based on engine operating conditions. The sensors may estimate a condition of the intake air received at the compressor inlet from the intake passage as well as the air charge recirculated through passage 60. One or more sensors may also be coupled to intake passage 42 upstream of compressor 114 for determining a composition and condition of air charge entering the compressor. These sensors may include, for example, a barometric pressure sensor 58. In addition, a throttle inlet pressure (TIP) sensor 59 may be coupled downstream of CAC 18 and upstream of throttle valve 20 for estimating a boost pressure delivered to the engine.

Controller 12 may be included in a control system 14. Controller 12 is shown receiving information from a plurality of sensors 16 (various examples of which are described herein) and sending control signals to a plurality of actuators 81 (various examples of which are described herein). As one example, sensors 16 may include an exhaust gas sensor 126 located upstream of turbine 116, MAP sensor 124, an exhaust temperature sensor 128, an exhaust pressure sensor 129, compressor inlet temperature sensor 55, compressor inlet pressure sensor 56 (e.g., for measuring Pi), a mass air flow (MAF) sensor 57, pressure sensor 58 and TIP sensor 59. Other sensors, such as additional pressure, temperature, air/fuel ratio, and composition sensors, may be coupled to various locations in vehicle system 100. In addition or in place of the depicted sensors, the controller may infer or model values for pressures, temperatures and/or flow rates based on operating conditions. The actuators 81 may include, for example, throttle valve 20, CCRV 62, electric motor 108, waste-gate actuator 92, and fuel injector 66. Controller 12 may receive input data from the various sensors, process the input data, and employ the various actuators to adjust engine operation based on the received signals and instructions stored on a memory of the controller. The controller may employ the actuators in response to the processed input data based on instruction or code programmed therein corresponding to one or more routines, such as example control routines described herein with regard to FIG. 2. As an example, responsive to an increase in the required torque reserve while operating at part load conditions, the controller may supply power to the electric assist motor to operate the motor in a regenerative mode, applying negative motor torque on the turbocharger to decelerate the turbine while holding the throttle more open and with less spark timing retard being applied.

Figure 2:
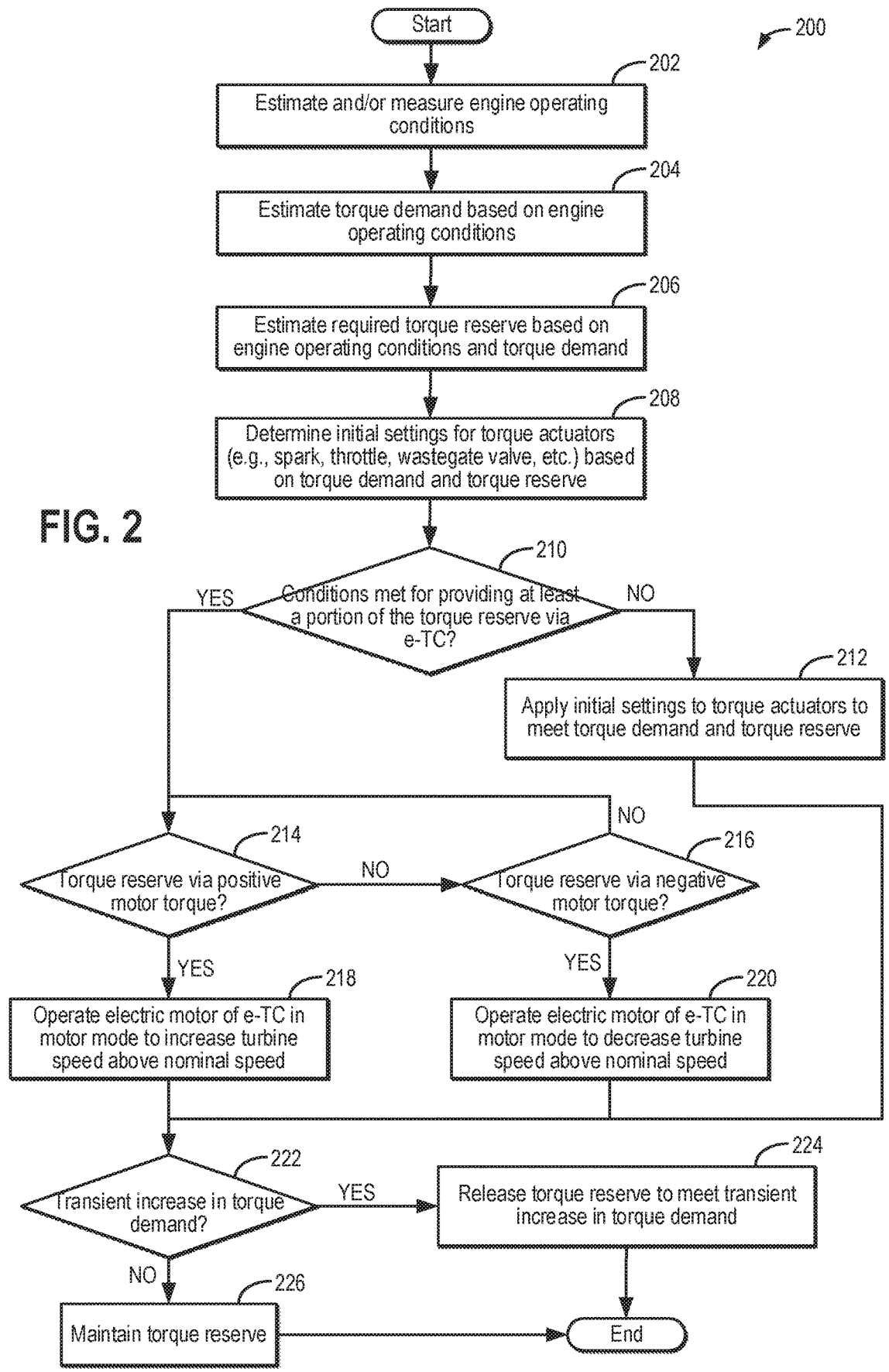
FIG. 2 depicts a high-level flow chart of a method for providing a portion of torque reserve via motor torque from an electric assist turbocharger.

Turning now to FIG. 2, an example method 200 is shown for providing torque reserve in an engine via a combination of throttle reserve, spark reserve, and electric assist from an electric turbocharger. The method enables engine efficiency to be improved as compared to other torque reserve strategies, particularly at part load conditions, by reducing efficiency losses from spark retard usage. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes estimating and/or measure engine operating conditions. These includes, for example, engine speed, MAP, MAF, pedal position, ambient conditions such as ambient temperature, pressure, and humidity, engine dilution, etc. At 204, the method includes estimating an engine torque demand based on the engine operating conditions. For example, the torque demand may be mapped as a function of the pedal position, such as via a model an algorithm, or a look-up table.

At 206, the method includes estimating a required amount of torque to be held in reserve (herein also referred to as torque reserve) based on the engine operating conditions and further based on the torque demand. For example, the torque reserve required may be mapped as a function of the engine load, such as via a model an algorithm, or a look-up table. One example map that may be used to estimate the required torque reserve is shown at FIG. 3. As shown at map 300, specifically at plot 302, torque reserve may have an inverse relationship with engine load. Thus at idle to part-load conditions, a higher amount of torque reserve may be required in anticipation of a sudden increase in torque demand. In addition, the engine may have a defined idle torque reserve that is held at idle conditions to improve drive away smoothness. In comparison, at higher load conditions, a smaller amount of torque reserve may be required. At high load, torque reserve is reduced, or removed when operating at or close to WOT.

Further still, torque reserve values may vary with operator selected drive or vehicle performance settings, such as a preference for fuel economy or performance. As an example, if a driver selects a preference for fuel economy, large transients are not expected, and therefore a smaller torque reserve may be requested. As another example, if a driver selects a preference for performance (e.g., a sport mode), large transients may be expected, and therefore a larger torque reserve may be requested.

At 208, the method includes determining initial settings for various torque actuators based on the torque demand and the torque reserve. For example, initial settings may be determined for throttle position, spark timing (e.g., spark timing retard or advance), waste-gate valve position, etc. Still other actuators whose settings may be determined include an EGR valve, a compressor recirculation valve, etc.

At 210, the method includes confirming if conditions are met for providing at least a portion of the torque reserve via the electric assisted turbocharger (e-TC). Example conditions where torque reserve may be provided, at least in part, by the electric turbocharger include a state of charge (SOC) of a system battery coupled to the electric motor being low enough to accept charge, such as when the SOC is below a non-zero threshold. If the SOC is above the threshold, the electric turbocharger cannot be used to provide negative torque based torque reserve. Another example condition includes part-load boost. Negative motor torque may not be used to generate torque reserve when the manifold pressure (MAP) is below atmospheric and there is insufficient turbocharger turbine speed.

If conditions are not met, then at 212, the method includes applying the initial settings to the torque actuators to meet the torque demand and the torque reserve. For example, spark timing may be retarded from a timing based on the torque demand to provide a spark reserve that meets the torque reserve. As another example, throttle position may be held more closed relative to a position based on the torque demand to provide a throttle or air reserve that meets the torque reserve.

If conditions are met for enabling electric turbocharger assist in torque reserve creation, then at 214, it is determined if conditions are present for providing at least a portion of the torque reserve via positive motor torque. As an example, during idle conditions and selected part-load conditions, additional boost pressure may be generated and held in reserve (known as boost reserve) for release during a transient increase in torque demand, the boost reserve acting as a source of reserve torque. As another example, positive motor torque can be used to generate torque reserve when engine efficiency is not the priority but response time is (that is, maximum response is desired in minimum time). Optionally, the turbocharger may run at the surge limit and use spark and fuel to reduce engine output torque and instantly reintroduce them if torque is demanded. In a further example, positive motor torque may be used to lower the battery SOC. For example, based on navigational input regarding a planned trajectory, including traffic, grade information, etc., a number of battery charging opportunities may be identified based on future part-load conditions where negative motor torque can be used to create torque reserve. An engine controller may accordingly use positive motor torque prior to those opportunities so as to provide a battery SOC that allows for battery charging during part load conditions.

If conditions are met for providing torque reserve via positive motor torque, then at 218, the method includes operating the electric motor of the electric turbocharger to increase the turbine speed above a nominal speed. The motor is operated in the motoring mode and positive motor torque is imparted to the turbocharger shaft. Herein the nominal speed is the turbine speed that would have been achieved if the initial settings of the various torque actuators were maintained (and no boost assist were provided). In one example, as the overall torque reserve requested increases, the boost reserve may be increased by increasing the positive torque applied by the electric motor on the electric turbocharger to spin up the turbine, and thereby the compressor. At the same time, the throttle opening may be reduced to hold the boost pressure in reserve. By providing a portion of the torque reserve as boost reserve, the need for spark based torque reserve is reduced, improving engine performance. During a later condition, when torque demand suddenly increases, the torque demand can be met by opening the throttle to release the boost reserve and increase the manifold pressure.

If conditions are not met for providing torque reserve via positive motor torque, then at 216, it may be determined if conditions are present for providing at least a portion of the torque reserve via negative motor torque. As an example, during selected other part-load conditions, turbine speed can be reduced by operating the boost assist motor in a regenerative mode. Specifically, torque reserve is created through an intentionally slowed down turbocharger taking the place of throttle based torque reserve and at least some of the spark based torque reserve. For example, the boost assist motor can be operated in the regenerative mode to generate torque reserve during conditions when an increase in the battery SOC is desired, and when improved efficiency is prioritized over response time.

If conditions are met for providing torque reserve via negative motor torque, then at 220, the method includes operating the electric motor of the electric turbocharger to decrease the turbine speed below the nominal speed. The reduced speed may be based on the desired torque reserve, the reduced speed lowered relative to the nominal speed as the desired torque reserve increases. Herein the nominal speed is the turbine speed that would have been achieved at the current engine load if the initial settings of the various torque actuators were maintained (and no boost assist were provided). The motor is operated in the regenerative mode and negative motor torque is imparted to the turbocharger shaft. In one example, as the overall torque reserve requested increases, the torque reserve contribution of the electric turbocharger may be increased by increasing the negative torque applied by the electric motor on the electric turbocharger to spin down the turbine, and thereby the compressor. At the same time, the throttle opening may be increased to reduce the throttle based torque reserve. Additionally, spark timing may be advanced. A degree of increasing the intake throttle opening and advancing spark timing may be based on the reduced speed of the turbocharger and a desired torque reserve. Specifically, the controller may apply negative motor torque to intentionally reduce the turbine speed (to a lower speed than what would naturally occur) to decrease the manifold pressure and reduce the air mass being delivered into the engine, effectively making it a controllable throttle. For example, the intake throttle opening may be increased relative to a nominal throttle opening corresponding to the current engine load, and spark timing may be advanced relative to a nominal spark timing corresponding to the current engine load. As the turbocharger speed is reduced, the throttle reserve can be reduced, or removed, and the spark timing can be further advanced (reducing the spark based torque reserve) to increase the combustion efficiency. Torque reserve through the intentionally slowed down turbocharger can then take the place of the throttle based torque reserve and some of the spark based torque reserve. This extra energy can be used to replenish the battery powering the electric motor and supplement the alternator reducing the work required by the alternator. For example, depending on the application the energy recovered by the electric assisted turbocharger could be enough to off-load some of the alternator's work. In high SOC scenarios, optionally the controller may reduce the alternator load and use the energy from the battery powering the electric turbocharger.

From each of 218, 220, and 212, the method moves to 222 where it is determined if there is a transient increase in torque demand. This may include more torque being demanded and/or torque being demanded at a faster rate. If yes, then at 224, the method includes releasing the torque reserve to meet the transient increase in torque demand. In one example, where the torque reserve was created via spark and throttle based reserve, releasing the torque reserve includes advancing spark timing and moving the throttle to a more open position. In another example, where the torque reserve was created at least in part using boost reserve, releasing the torque reserve includes opening the throttle to release the held boost pressure into the intake manifold. In still another example, where the torque reserve was created at least in part using negative motor torque, releasing the torque reserve includes reducing the regeneration load or going into positive assist based on the demanded rate of torque increase demanded is large. For example, if the demanded torque increase is larger than a threshold amount, the regeneration load is decreased by decreasing the motor speed and reducing the negative motor torque applied on the electric turbocharger. If the demanded torque increase is larger than the threshold, in addition to disabling the negative motor torque, the motor speed may be increased to provide positive motor torque to the electric turbocharger.

In one example, the torque reserve is created based on an anticipated increase in torque demand, the torque demand anticipated based on drive conditions, drive history, navigational input, operator selected vehicle performance setting, etc. A rate of releasing the torque reserve can then be adjusted based on the actual increase in torque demand relative to the anticipated increase. As an example, responsive to the actual increase in torque demand being smaller than the anticipated increase in torque demand, the applied negative torque can be reduced at a slower rate. In comparison, responsive to the actual increase in torque demand being at or above the anticipated increase in torque demand, the applied negative torque can be reduced at a faster rate. Furthermore, additional boost assist may be provided via application of positive motor torque.

Else, if there is no increase in torque demand, the torque reserve may be maintained or reduced. The method then ends. In this way, engine efficiency is improved through regeneration and the SOC of a system battery can be advantageously increased. As a result, the overall size of the battery can be reduced since more opportunities are provided for replenishing it.

Turning now to FIG. 3, an example map 300 of torque reserve contribution from various torque actuators are shown as a function of engine load. The map of FIG. 3 may be referred to by an engine controller when selecting whether to use positive motor torque or negative motor torque to create torque reserve.

Map 300 depicts engine load (or manifold pressure, MAP) along the x-axis and a corresponding total torque reserve required along the y-axis. As shown at plot 302, the torque reserve required increases as engine load decreases. Specifically, torque reserve requirement is higher at idle and part-load conditions (e.g., below a threshold engine load, such as at MAP below 1 atm, as indicated by the dashed vertical line) where a tip-in is likely and an increase in torque demand is anticipated. In comparison, torque reserve requirement is lower at higher load conditions (e.g., above a threshold engine load) where a tip-out is likely and a decrease in torque demand is anticipated.

A portion of the total torque reserve that is provided by spark based torque reserve is shown at plot 304. The contribution of spark reserve to total torque reserve decreases as engine load increases. A portion of the total torque reserve that is provided by throttle based torque reserve is shown at plot 306. Torque reserve may be provided by spark reserve only, such as shown in the depicted example at conditions where MAP is above 1 atm.

The torque reserve deficit can also be met using negative motor torque, as indicated by plot 308, at mid to high engine loads, such as when MAP is above 1 atm in the depicted example. The controller may intentionally slow down the turbocharger speed by applying negative motor torque on the turbocharger shaft via an electric motor so as to reduce the total air mass entering the engine's intake manifold. In particular, the reduction is air mass via turbine deceleration is achieved in lieu of reducing the throttle plate delta pressure (by closing the throttle plate by an amount). By reducing the turbocharger speed using the electric motor in regeneration mode, the same reduction in air mass as via TPDP is achieved but with energy being regenerated in the process. In one example, throttle based air (and torque) reserve is completely replaced with turbocharger negative motor torque based air (and torque) reserve.

In this way, an engine controller may determine a first part-load engine operating condition, and in response thereto generate torque reserve by applying negative motor torque via an electric motor on a turbocharger shaft. Therein the controller may send a first signal to the electric motor to operate the motor in a regenerating mode. The first condition may be determined based on input from one or more of an engine speed sensor, a manifold pressure sensor, and a pedal position sensor. During the first condition, spark timing and throttle position may be adjusted in a first manner responsive to the applied negative torque. For example, spark timing may be advanced and throttle position may be moved to a more open position.

Further, the controller may determine a second part-load engine operating condition (which is not the first condition), and in response thereto generate torque reserve by applying positive motor torque via the electric motor to the turbocharger shaft. Therein the controller may send a second, different signal to the electric motor to operate the motor in a motoring mode. The second condition may be also determined based on input from one or more of the engine speed sensor, the manifold pressure sensor, and the pedal position sensor. During the second condition, spark timing and throttle position may also be adjusted in the first manner responsive to the applied negative torque. For example, spark timing may be advanced and throttle position may be moved to a more open position.

Further, the controller may determine a third part-load engine operating condition (which is not the first or the second condition), and in response thereto generate torque reserve by not applying any motor torque via the electric motor on the turbocharger shaft. Therein the controller may send a signal to the electric motor to maintain the motor disabled. The third condition may be also determined based on input from one or more of the engine speed sensor, the manifold pressure sensor, and the pedal position sensor. During the third condition, spark timing and throttle position may be adjusted in a second manner, different from the first manner, responsive to the absence of motor. For example, spark timing may be retarded and throttle position may be moved to a more closed position. The controller may select between the first, second, and third conditions based on sensor input indicative of engine speed and load, and accordingly adjust the motor torque applied on the shaft. The selecting may be further based on a battery state of charge. For example, the first condition may be confirmed when battery SOC is below a threshold, while the second condition may be confirmed when battery SOC is above the threshold.

Turning now to FIG. 4, a prophetic example of varying the torque reserve contribution from various torque actuators with changing engine conditions is shown. In one example, the actions depicted in FIG. 4 may be enabled via the method of FIG. 2. In the depicted example, a first scenario wherein torque reserve is generated by spark reserve and throttle based air reserve only is shown via dashed lines, while a second scenario wherein torque reserve is generated using negative torque from an electric motor coupled to an electric turbocharger is shown via solid lines. Map 400 depicts operator torque request (or torque demand) at plot 402. In one example, accelerator pedal position may be used infer operator torque request. A total torque reserve requested based on engine operating conditions and torque demand is shown at plots 404, 406. Throttle based torque reserve contribution is inferred from a throttle opening at plots 408, 410. Decreasing the throttle opening relative to a desired throttle position at a given engine load results in an amount of air being held in reserve ("air reserve"), creating reserve torque. In other words, throttle closure is used to reduce the air mass entering the intake manifold. The air held in reserve can then be released at a later time responsive to a transient increase in torque demand, allowing the corresponding torque reserve to be depleted for meeting the torque demand and improving engine response time. Spark based torque reserve contribution is inferred from a spark timing at plots 412, 414. Retarding spark relative to MBT at a given engine load results in later combustion, sending useful work to the exhaust, and creating reserve torque. Spark timing can be advanced to or towards MBT at a later time responsive to a transient increase in torque demand, allowing the torque reserve to be depleted for meeting the torque demand and improving engine response time.

Electric turbocharger based torque reserve contribution is inferred electric assist motor torque provided at plots 416, 418. Torque reserve may be provided in the form of boost reserve, generated by applying positive motor torque to spin up the turbocharger, relative to a desired turbine speed at a given engine load. Alternatively, torque reserve may be provided in the form of air reserve (or reduction in air mass entering the intake manifold), generated by applying negative motor torque to spin down the turbocharger, relative to a desired turbine speed at a given engine load, allowing for a more open throttle position at the corresponding engine load. Specifically, as negative motor torque is applied to generate torque reserve, the throttle opening is increased, and spark timing is advanced. In the depicted example, throttle opening is increase to WOT and spark timing is advanced to MBT. Turbine speed may also be affected by waste-gate valve position adjustments, as shown at plot 420. For example, turbine speed may be increased by moving the waste-gate valve to a more closed position, while turbine speed may be decreased by moving the waste-gate valve to a more open position. Changes in boost pressure due to motor torque application and waste-gate valve adjustments are depicted at plots 422, 424. Changes in turbine speed due to motor torque application and waste-gate valve adjustments are depicted at plots 426, 428. Changes in a battery state of charge (SOC) due to motor torque application is depicted at plots 430, 432.

In the depicted example, the requested torque changes (plot 402) over time with the torque intermittently increasing and then decreasing. The torque reserve that is provided (either spark and throttle reserve based, as shown at 406 or motor torque based, as shown at 404) is adjusted in correspondence but with an inverse function. In particular, torque reserve is increased (or generated) during conditions when torque demand reduces, such as at part-load conditions including an operator pedal tip-out, and torque reserve is decreased (or depleted) during conditions when torque demand increases, such as at high-load conditions including an operator pedal tip-in. When the torque reserve is spark and throttle based (plot 406), the throttle opening fluctuates being more closed (when torque reserve is to be generated) and more open (when torque is to be depleted), while remaining less than fully open (WOT), as shown at plot 410. By reducing the opening of the throttle when torque reserve is required, the air mass inducted into the engine's intake manifold is reduced. Concurrently, spark reserve is also created, as shown at plot 414, by retarding spark timing by a larger amount from MBT. Since this torque reserve is not turbocharger based, the electric motor of the electric turbocharger remains disabled and the assist from the motor remains at zero (plot 418). As a result, the battery SOC does not change (plot 432). A targeted boost pressure (plot 424) is provided by reducing the waste-gate opening (plot 420) to increase boost pressure or increasing the opening to reduce boost pressure.

In comparison, when the torque reserve is turbocharger based (plot 404), the throttle can be held at WOT, as shown at plot 408. In place of the throttle, during conditions when torque reserve is needed, the required reduction in air mass can be provided via negative motor torque applied on the turbocharger (plot 416). At those times, the battery is charged with the motor acting as a generator. Then, when torque reserve is to be depleted, the negative motor torque is discontinued. Furthermore, when the torque demand is high or fast enough, the transient demand is met by applying positive electric assist torque from the electric motor on the turbocharger. At those times, the battery charge is used. As a result, over a period of boost events, a larger number of battery charging opportunities are achieved, allowing for a higher average battery SOC. The targeted boost pressure (plot 422) is provided by coordinating the motor torque adjustments with adjustments to the waste-gate opening (plot 420).

As a result of the use of turbocharger based torque reserve, a larger magnitude change in boost pressure is achieved during torque transients as compared to the spark and throttle based torque reserve. For example, during a tip-in where there is an increase in torque demand, a larger rise in boost pressure can be provided, improving boosted engine performance.

In this way, operation of an electric assisted turbocharger can be used to generate at least a portion of torque reserve. By varying the motor torque applied on the turbocharger shaft via an electric motor, in co-ordination with other engine torque actuators, such as throttle position and spark timing, a desired torque reserve may be provided more efficiently. For example, a required torque reserve may be provided with reduced reliance on spark retard. By applying negative motor torque during selected part-load engine operating conditions to intentionally reduce turbine speed, an air mass provided to the engine can be reduced while enabling an intake throttle to be held more open. The technical effect of providing a required air mass reduction via reduction in turbine speed instead of via additional throttle closure is that an engine may be operated with the throttle more open (e.g., wide open) over a longer range of engine operating conditions. In addition, energy can be harnessed via the motor (acting as a generator) for charging a system battery. During other part load conditions, a portion of the torque reserve may be met by applying positive motor torque on the turbocharger to generate and hold additional boost pressure in reserve. Also, by providing at least some torque reserve via an electric turbocharger, engine fuel penalties associated with overscheduling of spark reserve (such as when changes in torque demand are different from what was anticipated) can be reduced.

One example method comprises: reducing a speed of a turbocharger via an electric motor while increasing intake throttle opening and advancing spark timing, a degree of the increasing the intake throttle opening and advancing the spark timing based on the reduced speed of the turbocharger and a desired torque reserve. In the preceding example, additionally or optionally, reducing the speed via the electric motor includes applying a negative motor torque on a turbocharger shaft to reduce a turbine speed. In any or all of the preceding examples, additionally or optionally, the reduced speed is based on the desired torque reserve, the reduced speed lowered relative to a nominal speed as the desired torque reserve increases. In any or all of the preceding examples, additionally or optionally, the nominal speed includes a nominal turbine speed at a current engine load, wherein the intake throttle opening is increased relative to a nominal throttle opening corresponding to the current engine load, and spark timing is advanced relative to a nominal spark timing corresponding to the current engine load. In any or all of the preceding examples, additionally or optionally, the method further comprises, responsive to an increase in torque demand, reducing the applied negative motor torque. In any or all of the preceding examples, additionally or optionally, the increase in torque demand is an actual increase in torque demand and wherein the desired torque reserve is based on an anticipated increase in torque demand from the current engine load. In any or all of the preceding examples, additionally or optionally, responsive to the actual increase in torque demand being smaller than the anticipated increase in torque demand, reducing the applied negative torque at a slower rate, and responsive to the actual increase in torque demand being at or above the anticipated increase in torque demand, reducing the applied negative torque at a faster rate. In any or all of the preceding examples, additionally or optionally, reducing the turbine speed includes reducing a mass air flow into an engine intake manifold. In any or all of the preceding examples, additionally or optionally, the engine is coupled in a vehicle, and wherein the desired torque reserve is based on navigational input, vehicle drive history, and driver selected preference for performance relative to fuel economy.

Another example method for a boosted engine comprises: during a first condition, increasing a speed of a turbocharger via an electric motor while decreasing intake throttle opening and advancing spark timing, a degree of the decreasing the intake throttle opening and advancing the spark timing based on the increased speed of the turbocharger and a desired torque reserve; and during a second condition, decreasing a speed of a turbocharger via an electric motor while increasing intake throttle opening and advancing spark timing, a degree of the increasing the intake throttle opening and advancing the spark timing based on the decreased speed of the turbocharger and the desired torque reserve. In the preceding example, additionally or optionally, the first condition includes a battery state of charge being higher than a threshold, the second condition includes the battery state of charge being lower than the threshold, the method further comprising transitioning from the first condition to the second condition responsive to a change in the battery state of charge. In any or all of the preceding examples, additionally or optionally, the first condition includes an operator selected preference for performance over fuel efficiency, and wherein the second condition includes an operator selected preference for fuel efficiency over performance. In any or all of the preceding examples, additionally or optionally, a manifold air flow is reduced during the second condition relative to the first condition. In any or all of the preceding examples, additionally or optionally, increasing the speed of the turbocharger via the electric motor during the first condition includes applying positive motor torque from the electric motor on a shaft of the turbocharger to increase turbine speed, and wherein decreasing the speed of the turbocharger via the electric motor during the second condition includes applying negative motor torque from the electric motor on the shaft of the turbocharger to decrease the turbine speed. In any or all of the preceding examples, additionally or optionally, the method further comprises, during a third condition, applying no motor torque from the electric motor on the shaft of the turbocharger while decreasing intake throttle opening and retarding spark timing, a degree of the decreasing the intake throttle opening and retarding the spark timing based on the desired torque reserve.

Another example engine system of a vehicle, comprises: an engine; a turbocharger having a turbine coupled to a compressor via a shaft; an electric motor coupled to the shaft, the motor powered by a battery; a spark plug; a throttle coupled to an intake of the engine; and a controller with computer readable instructions stored on non-transitory memory that when executed cause the controller to: operate the engine in a first mode, responsive to a first part-load condition, with negative motor torque applied via the electric motor on the shaft to decrease turbine speed; and operate the engine in a second mode, responsive to a second, different part-load condition, with positive motor torque applied via the electric motor on the shaft to increase turbine speed. In the preceding example, additionally or optionally, the controller includes further instructions that cause the controller to select between the first and second mode based on a state of charge of the battery, the first mode selected when the battery state of charge is lower than a threshold, the second mode selected when the battery state of charge is higher than the threshold. In any or all of the preceding examples, additionally or optionally, the controller includes further instructions that cause the controller to increase throttle opening and advance spark timing based on the decrease in turbine speed during the first mode, and increase throttle opening and advance spark timing based on the increase in turbine speed during the second mode. In any or all of the preceding examples, additionally or optionally, the controller includes further instructions that cause the controller to operate the engine in a third mode, responsive to a third part-load condition, with no motor torque applied via the electric motor on the shaft and with throttle opening decreased and spark timing retarded. In any or all of the preceding examples, additionally or optionally, the system further comprises an input device for receiving an operator selection, and wherein the controller includes further instructions that cause the controller to select the first mode when the operator selection includes fuel economy, and select the second mode when the operator selection includes vehicle performance.

In a further representation, a method for an engine includes, during a first tip-out, reducing manifold air flow by reducing an opening of an intake throttle and retarding spark timing while maintaining turbine speed of a turbocharger. Further, during a second tip-out, the method includes reducing the manifold air flow by reducing the turbine speed while maintaining or increasing the opening of the intake throttle and while maintaining or advancing spark timing. In the preceding example, additionally or optionally, boost pressure is reduced by a smaller amount during the first tip-out relative to the second tip-out. In any or all of the preceding examples, additionally or optionally, the method further comprises, during a first tip-in following the first tip-out, increasing manifold air flow by increasing the opening of the intake throttle and advancing spark timing while maintaining the turbine speed. Further, during a second tip-in following the second tip-out, the method includes increasing the manifold air flow by increasing the turbine speed while maintaining or increasing the opening of the intake throttle and while maintaining or advancing spark timing. In the preceding example, additionally or optionally, boost pressure is increased by a larger amount during the first tip-in relative to the second tip-in. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
reducing a speed of a turbocharger via an electric motor while increasing intake throttle opening and advancing spark timing, a degree of the increasing the intake throttle opening and advancing the spark timing based on the reduced speed of the turbocharger and a desired torque reserve.

2. The method of claim 1, wherein reducing the speed via the electric motor includes applying a negative motor torque on a turbocharger shaft to reduce a turbine speed.

3. The method of claim 1, wherein the reduced speed is based on the desired torque reserve, the reduced speed lowered relative to a nominal speed as the desired torque reserve increases.

4. The method of claim 3, wherein the nominal speed includes a nominal turbine speed at a current engine load, wherein the intake throttle opening is increased relative to a nominal throttle opening corresponding to the current engine load, and spark timing is advanced relative to a nominal spark timing corresponding to the current engine load.

5. The method of claim 2, further comprising, responsive to an increase in torque demand, reducing the applied negative motor torque.

6. The method of claim 5, wherein the increase in torque demand is an actual increase in torque demand and wherein the desired torque reserve is based on an anticipated increase in torque demand from the current engine load.

7. The method of claim 6, wherein responsive to the actual increase in torque demand being smaller than the anticipated increase in torque demand, reducing the applied negative torque at a slower rate, and responsive to the actual increase in torque demand being at or above the anticipated increase in torque demand, reducing the applied negative torque at a faster rate.

8. The method of claim 1, wherein reducing the turbine speed includes reducing a mass air flow into an engine intake manifold.

9. The method of claim 1, wherein the engine is coupled in a vehicle, and wherein the desired torque reserve is based on navigational input, vehicle drive history, and driver selected preference for performance relative to fuel economy.

10. A method for a boosted engine, comprising:
during a first condition, increasing a speed of a turbocharger via an electric motor while decreasing intake throttle opening and advancing spark timing, a degree of the decreasing the intake throttle opening and advancing the spark timing based on the increased speed of the turbocharger and a desired torque reserve; and
during a second condition, decreasing a speed of a turbocharger via an electric motor while increasing intake throttle opening and advancing spark timing, a degree of the increasing the intake throttle opening and advancing the spark timing based on the decreased speed of the turbocharger and the desired torque reserve.

11. The method of claim 10, wherein the first condition includes a battery state of charge being higher than a threshold, the second condition includes the battery state of charge being lower than the threshold, the method further comprising transitioning from the first condition to the second condition responsive to a change in the battery state of charge.

12. The method of claim 10, wherein the first condition includes an operator selected preference for performance over fuel efficiency, and wherein the second condition includes an operator selected preference for fuel efficiency over performance.

13. The method of claim 10, wherein manifold air flow is reduced during the second condition relative to the first condition.

14. The method of claim 10, wherein increasing the speed of the turbocharger via the electric motor during the first condition includes applying positive motor torque from the electric motor on a shaft of the turbocharger to increase turbine speed, and wherein decreasing the speed of the turbocharger via the electric motor during the second condition includes applying negative motor torque from the electric motor on the shaft of the turbocharger to decrease the turbine speed.

15. The method of claim 14, further comprising, during a third condition, applying no motor torque from the electric motor on the shaft of the turbocharger while decreasing intake throttle opening and retarding spark timing, a degree of the decreasing the intake throttle opening and retarding the spark timing based on the desired torque reserve.

16. An engine system of a vehicle, comprising:
an engine;
a turbocharger having a turbine coupled to a compressor via a shaft;

an electric motor coupled to the shaft, the motor powered by a battery;
a spark plug;
a throttle coupled to an intake of the engine; and
a controller with computer readable instructions stored on non-transitory memory that when executed cause the controller to:
  operate the engine in a first mode, responsive to a first part-load condition, with negative motor torque applied via the electric motor on the shaft to decrease turbine speed; and
  operate the engine in a second mode, responsive to a second, different part-load condition, with positive motor torque applied via the electric motor on the shaft to increase turbine speed; wherein the controller includes further instructions that cause the controller to increase throttle opening and advance spark timing based on the decrease in turbine speed during the first mode, and increase throttle opening and advance spark timing based on the increase in turbine speed during the second mode.

17. The system of claim 16, wherein the controller includes further instructions that cause the controller to select between the first and second mode based on a state of charge of the battery, the first mode selected when the battery state of charge is lower than a threshold, the second mode selected when the battery state of charge is higher than the threshold.

18. The system of claim 16, wherein the controller includes further instructions that cause the controller to operate the engine in a third mode, responsive to a third part-load condition, with no motor torque applied via the electric motor on the shaft and with throttle opening decreased and spark timing retarded.

19. The system of claim 16, further comprising an input device for receiving an operator selection, and wherein the controller includes further instructions that cause the controller to select the first mode when the operator selection includes fuel economy, and select the second mode when the operator selection includes vehicle performance.

* * * * *